United States Patent
Yadav et al.

(10) Patent No.: US 12,556,933 B2
(45) Date of Patent: Feb. 17, 2026

(54) CHANNEL SELECTION AND RESELECTION FOR CBSD USING RIC

(71) Applicant: Radisys Corporation, Hillsboro, OR (US)

(72) Inventors: Shailendra Yadav, Haryana (IN); Rajiv Gupta, Haryana (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 352 days.

(21) Appl. No.: 18/499,601

(22) Filed: Nov. 1, 2023

(65) Prior Publication Data

US 2025/0142349 A1    May 1, 2025

(51) Int. Cl.
*H04W 16/14*    (2009.01)
*H04W 72/04*    (2023.01)

(52) U.S. Cl.
CPC ........... *H04W 16/14* (2013.01); *H04W 72/04* (2013.01)

(58) Field of Classification Search
CPC .............................. H04W 16/14; H04W 72/04
See application file for complete search history.

(56) References Cited

U.S. PATENT DOCUMENTS

2022/0007198 A1 * 1/2022 Mahalingam ......... H04W 16/20

FOREIGN PATENT DOCUMENTS

EP    4109951 A1 * 12/2022    ............ H04W 16/14

* cited by examiner

Primary Examiner — Siming Liu
(74) Attorney, Agent, or Firm — Stoel Rives LLP

(57) ABSTRACT

A non-real time RIC is configured to perform channel selection and reselection for an O-RAN to operate a CBRS network. The non-real time RIC includes a REST API interface configured to receive, from a domain proxy, operator-configured channel preference information and domain proxy time series data, and to provide a channel selection from the non-real time RIC; an R1 interface configured to receive, from an SMO database storing A1 feedback from a near-real time RIC, the A1 feedback representing channel interference over time; and an A1 interface configured to trigger, toward the near-real time RIC, a policy for channel reselection in response to the domain proxy time series data and the A1 feedback.

20 Claims, 15 Drawing Sheets

| Concatenation | BW and Channel Type<br>Preferred BW: 40 MHz<br>Preferred range: 3600-3640 MHz<br>Preferred Channel Type: PAL | EIRP<br>Preferred MaxEIRP = 17 | Final |
|---|---|---|---|
| 3550-3590 [40MHz] | 3600-3640: PAL [40MHz, PAL] | 3600-3640 : PAL : Eirp-17 | 3600-3640 : PAL : Eirp-17 |
| ... | 3590-3630: PAL [40MHz (30 MHz in range), PAL] | 3600-3620 : PAL : Eirp-17 | 3600-3620 : PAL : Eirp-17 |
| 3600-3640 [40MHz] | 3600-3620: PAL [20MHz, PAL] | 3620-3640 : PAL : Eirp-17 | 3620-3640 : PAL : Eirp-17 |
| ... | 3620-3640: PAL [20MHz, PAL] | ... | ... |
| 3660-3700 [40MHz] | 3570-3610: PAL [40MHz (10 MHz in range), PAL] | 3570-3610 : PAL : Eirp-17 | 3570-3610 : PAL : Eirp-17 |
| 3550-3570 [20MHz] | 3600-3610: PAL [10MHz, PAL] | ... | ... |
| ... | 3590-3630: GAA [40MHz (30 MHz in range), GAA] | 3590-3630 : GAA : Eirp-15 | ... |
| 3680-3700 [20MHz] | 3550-3590: GAA [40MHz, GAA] | 3550-3590 : GAA : Eirp-17 | 3590-3630 : GAA : Eirp-17 |
| 3550-3560 [10MHz] | 3660-3700: GAA [40MHz, GAA] | | 3550-3590 : GAA : Eirp-17 |
| 3560-3570 [10MHz] | ... | 3660-3670 : GAA : Eirp-12 | 3660-3670 : GAA : Eirp-12 |
| ... | ... | ... | ... |
| 3690-3700 [10MHz] | 3690-3700: GAA | ... | ... |

FIG. 5

CHANNEL SELECTION AND RESELECTION FOR CBSD USING RIC

TECHNICAL FIELD

This disclosure generally relates to citizens broadband radio service (CBRS) and, more specifically, a RAN intelligent controller (RIC) for selecting a channel in the CBRS band for a citizens broadband radio service device (CBSD).

BACKGROUND INFORMATION

CBRS is a 150 MHz wide broadcast band in the U.S. in the 3.5 GHz band (from 3550 MHz to 3700 MHZ). The FCC opened this band for commercial use, and it is being used for wireless broadband services. A CBRS network refers to a network operating within this specific band and adhering to the rules and regulations associated with it, which include dynamic spectrum sharing managed by the spectrum access system (SAS).

A CBSD is a device that provides wireless broadband service in the CBRS band. This can include base stations (e.g., next-generation NodeB, gNB), small cells, and other types of devices. In the context of CBRS, a domain proxy represents one or more CBSD devices for the SAS. It aggregates and forwards the requests and responses between CBSDs and the SAS.

SAS is a dynamic spectrum management system that protects the incumbents (highest tier users) in the CBRS band from harmful interference from secondary users. Incumbent or primary users are those who have historical or primary rights to use a specific spectrum. In the CBRS framework, this might include entities like naval radar systems or satellite ground stations. They have the highest priority and are protected from harmful interference. Secondary users are those who can access the spectrum when it is not being used by the primary users. Their usage is managed dynamically to ensure they do not interfere with the primary users. A secondary grant is the authorization given to secondary users, allowing them to use a specific part of the spectrum under certain conditions. The grant specifies parameters like frequency range, power levels, and channel type. However, this grant is conditional-if a primary user needs the spectrum, the secondary user might be required to vacate or change frequencies. The dynamic nature of these secondary grants, especially in the CBRS framework, is managed by the SAS, which ensures efficient use of the spectrum while protecting incumbent users from interference by dynamically assigning frequencies to the lower tier, i.e., Priority Access License (PAL) and General Authorized Access (GAA). PAL is a second tier in the CBRS band. PAL users get priority over GAA users but have to accept interference from the top tier, which is the incumbent users (like naval radar systems). GAA is the lowest tier and has to accept interference from the higher tiers. In the context of CBRS and wireless communication, a secondary grant refers to a permission given to a device or system to operate in a particular frequency band, but with a lower priority than primary or incumbent users.

When using GAA or PAL channels, there might be interruptions due to higher-tiered users, which can disrupt quality of service (QOS). Over time, the performance of a channel can degrade, and devices might need to switch channels even if they are not asked to by the SAS. All these factors can affect the reliability and QoS an operator can offer, potentially impacting their Service Level Agreement (SLA) with subscribers.

The SAS might ask a GAA or PAL user to vacate a channel because of a higher-tiered user. In such a case, a domain proxy/SON layer attempts to select another optimal channel to switch to, which can result in service disruption.

CBRS can be implemented in an Open Radio Access Network (O-RAN) architecture. An O-RAN is a disaggregated approach to deploying mobile fronthaul and midhaul networks built on cloud native principles. O-RAN is an evolution of the Next Generation RAN (NG-RAN) architecture, first introduced in 3GPP release 15 (5G version 1) technical specification 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

SUMMARY OF THE DISCLOSURE

This disclosure describes channel selection techniques for an O-RAN architecture in a CBRS network. The disclosed selection technique maintains service reliability and availability by ensuring the CBSD is always operating the best available channel and ensuring that the presence of higher-tiered CBSD does not require to release of the channel. Measurement of interference, cooperative periodic activities among SASs (CPAS) cycles, and similar patterns on the serving channels facilitates the selection of the best channel via AI/ML. Although higher-tiered CBSD and incumbent users may keep coming and going (resulting in the release of serving channels), the use of AI/MI with the help of RIC coordination predicts these incursions over the relevant period. With the help of this info, the CBSD is provided a reliable channel.

To optimize energy conservation through time-of-day traffic patterns, the DP will communicate with the RIC to solicit the appropriate channel acquisition, including bandwidth and transmission power, in order to efficiently accommodate the traffic patterns. These channels will be coordinated to synchronize with the CPAS cycle.

Advantages of realizing CBRS solution through O-RAN-compliant architecture include interference mitigation (better coordination), low down time due to incumbency, and low opex and capex (e.g., a public network can be extended to a private network). Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 5 is a table showing channel grouping into priority lists in accordance with one embodiment.

DETAILED DESCRIPTION OF EMBODIMENTS

Figure 1:
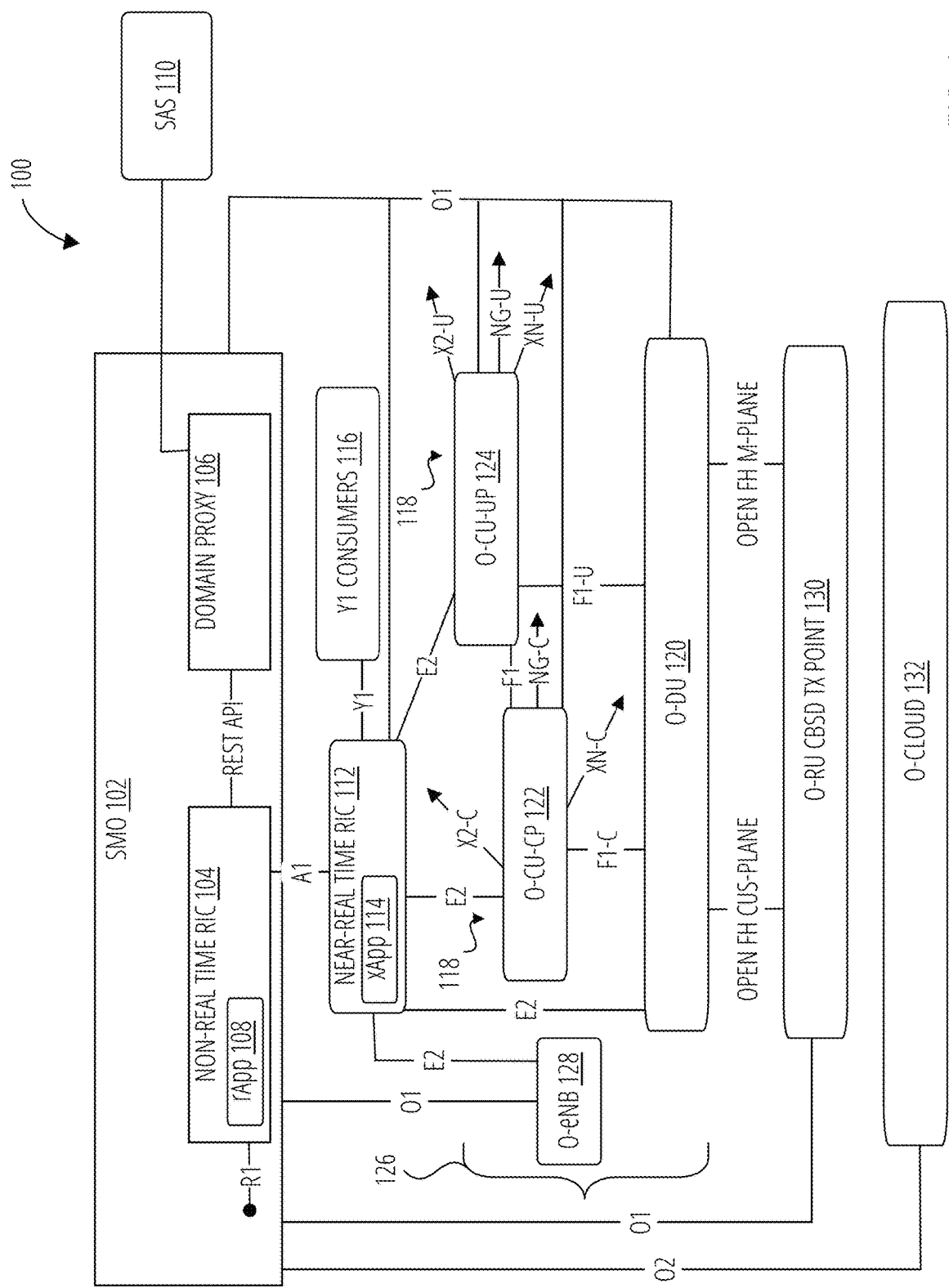
FIG. 1 is a block diagram of an O-RAN architecture in accordance with one embodiment.

FIG. 1 shows an example of the integration of CBRS network capabilities within an O-RAN architecture 100. In this architecture, CBRS capabilities are seamlessly integrated into the O-RAN framework, offering a modular and flexible RAN solution that capitalizes on the benefits of shared spectrum in the CBRS band.

Central to O-RAN architecture 100 is a service management and orchestration (SMO) 102 framework. Within the O-RAN context, SMO 102 is responsible for orchestrating and managing RAN services, ensuring optimized use of the CBRS spectrum, and seamless service delivery.

SMO 102 includes a non-real time RIC 104 and a domain proxy 106, which share a REST API interface. Non-real time RIC 104 handles non-real time radio policies and decisions, optimizing the CBRS network operations based on pre-defined policies and analytics. Non-real time RIC 104 includes an R1 interface with SMO 102 and a rApp 108 for performing channel selection and reselection, described in greater detail below.

Domain proxy 106 provides an interface between the CBRS devices and an SAS 110, streamlining channel assignments and ensuring protection for incumbent users within the CBRS band. Domain proxy 106 will be installed at SMO 102 as a microservice and communicates to non-real time RIC 104 via the REST API. Domain proxy 106 may serve multiple CBSD Tx points and associated transactions, where the number of CBSD Tx points depends on the implementation and SAS capacity.

Complementing the non-real time operations, a near-real time RIC 112 is also linked with SMO 102. It uses its xApp 114 to perform real-time radio management and optimization, dynamically adjusting to the ever-changing CBRS network conditions.

Y1 consumers 116 represent entities consuming RAN analytics information exposed from near-real time RIC 112.

O-RAN architecture 100 includes an O-CU 118 and an O-DU 120. O-CU 118 is shown in terms of both its control plane and user plane, i.e., an O-CU-CP 122 and O-CU-UP 124. O-CU 118 and O-DU 120 manage various aspects of the radio interface, crucial for the efficient operation of the CBRS network in an O-RAN setting. These components are also referred to as E2 nodes 126.

Another E2 node is shown as an O-eNB 128. O-eNB 128 is an evolved NodeB within the O-RAN, facilitating E-UTRA radio access technology.

An O-RU CBSD Tx point 130 signifies the transmission interface for the RU in the context of Cloud-Native Service Descriptors, highlighting the cloud-native approach of O-RAN.

O-Cloud 132 symbolizes the cloud infrastructure underpinning the O-RAN, offering scalability, flexibility, and agility to the CBRS operations.

Figure 2:
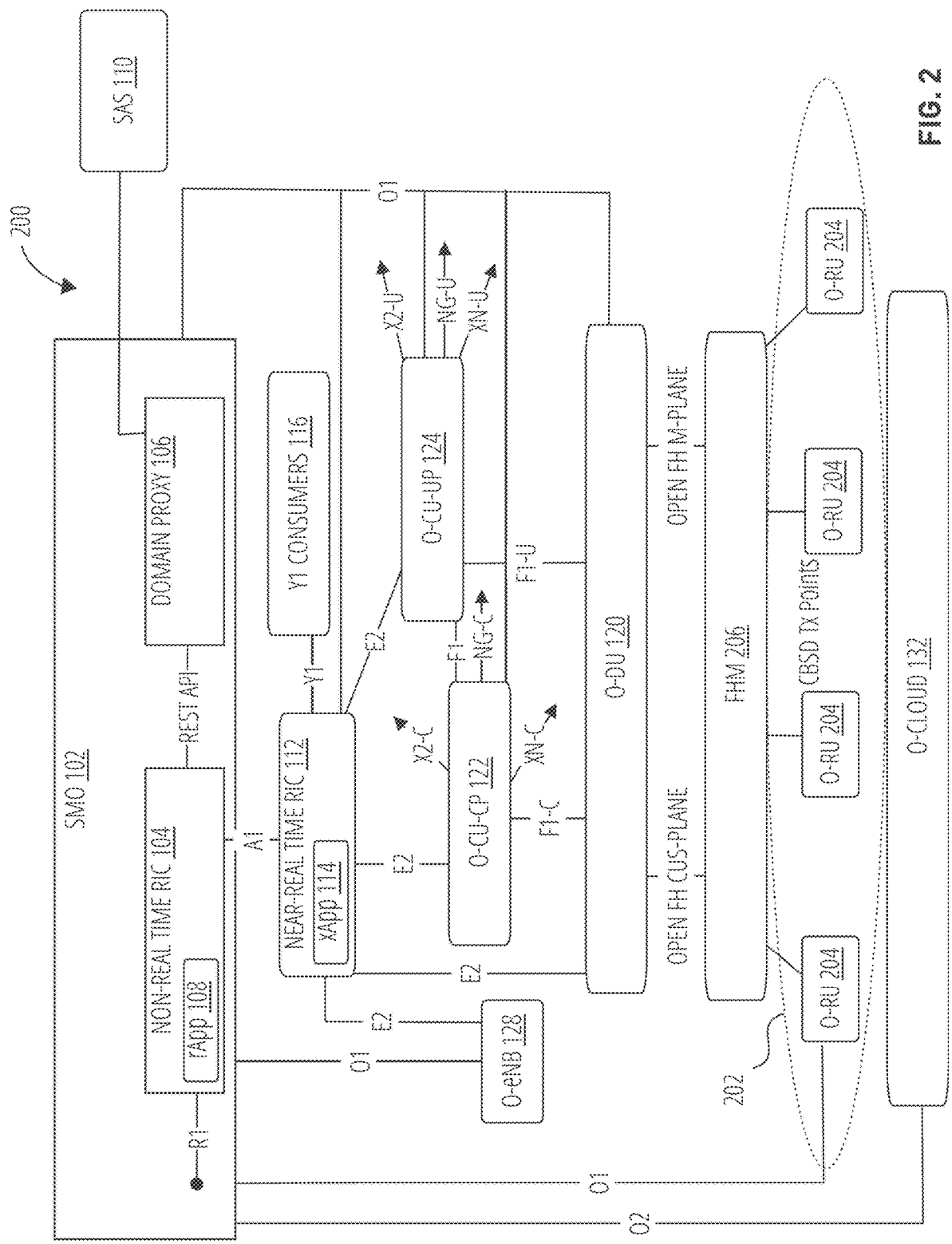
FIG. 2 is a block diagram of an O-RAN architecture in accordance with one embodiment.

In contrast to FIG. 1 showing O-DU 120 directly connected to O-RU CBSD Tx point 130 (and each O-RU may have a different ARFCN), FIG. 2 shows an O-RAN architecture 200 in which CBSDs 202 (O-RUs 204) are connected to O-DU 120 via an FHM 206.

Figure 3:
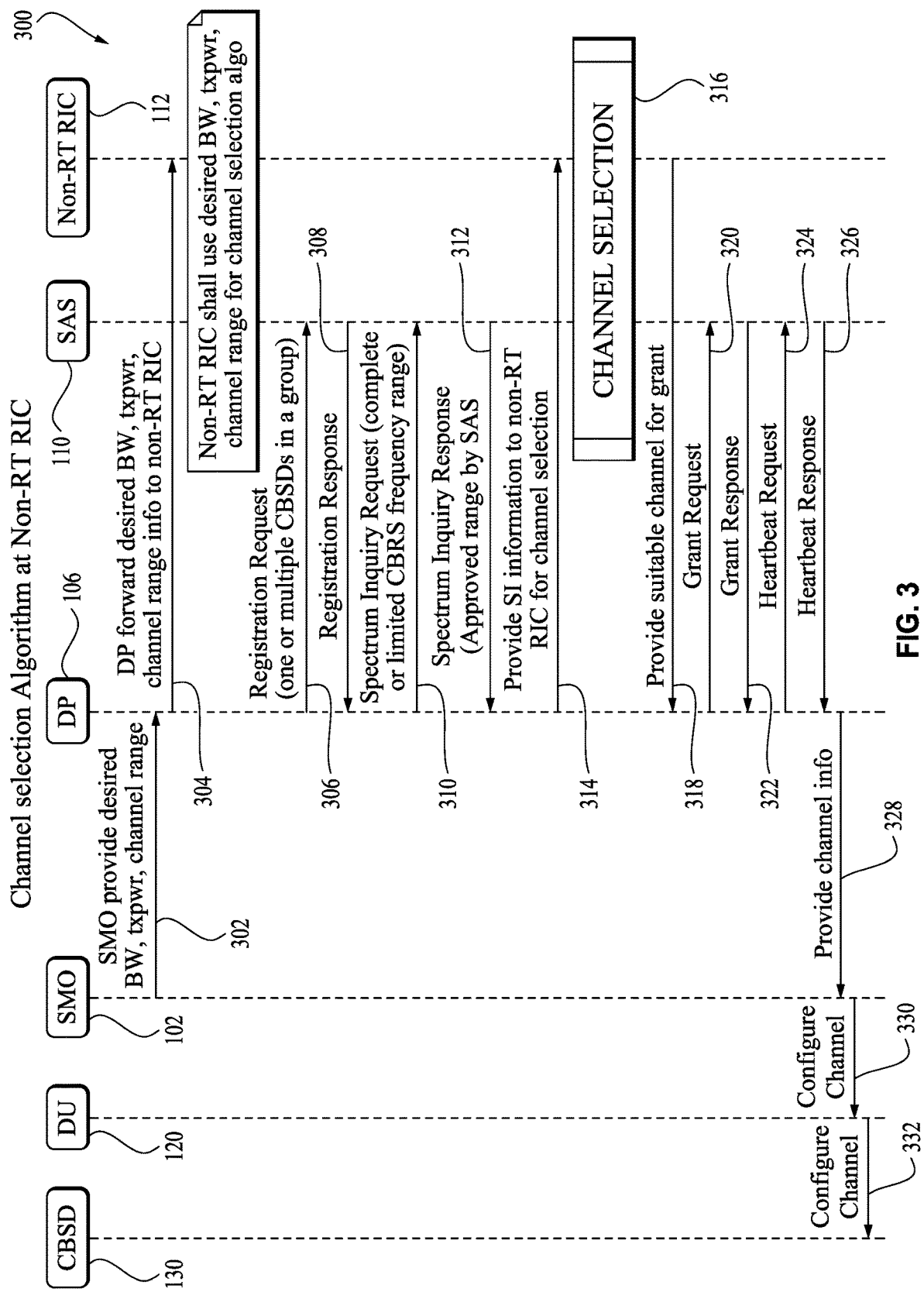
FIG. 3 is a message sequence diagram showing a process for channel selection in accordance with one embodiment.

FIG. 3 shows a process 300 for channel selection, based on an algorithm (see, e.g., FIG. 4) performed in rApp 108 of non-real time RIC 104. Initially, SMO 102 provides to domain proxy 106 operator-configured channel preference information 302. Operator-configured channel preference information 302 includes a desired bandwidth, transmit power, and channel range (i.e., from a start frequency to an end frequency). In one example, operator-configured channel preference information 302 includes: a desired bandwidth (BW) of 40 MHZ, a maximum effective isotropic radiated power (MaxEIRP) of 17 dB, and a channel range of 3600-3640 MHz.

Next, domain proxy 106 forwards 304 to non-real time RIC 104 a channel information trigger that includes operator-configured channel preference information 302. Domain proxy 106 may include an element management system (EMS) to facilitate communications with non-real time RIC 104. An EMS is essentially a system that manages network elements. These network elements can be the CBRS devices themselves, such as radios, access points, and so on. The EMS provides functions like fault management, configuration management, performance management, and security management for these devices. It is primarily responsible for ensuring that the network elements operate efficiently and effectively.

Domain proxy 106 then performs a registration request 306 with SAS 110. Registration request 306 may include one or multiple CBSDs in a group. SAS 110 then provides a registration response 308 to domain proxy 106.

Next, domain proxy 106 generates a spectrum inquiry (SI) request 310. This SI request 310 may specify the complete, or a portion of, the CBRS frequency range. In response, SAS 110 generates an SI response 312 approving the specified frequency range. SI response 312 includes SI information 314 (i.e., GAA vs PAL) for the specified range(s). An example of SI information 314 is as follows:

| SI Response |
|---|
| {LowFreq: 3550 HighFreq: 3560,<br>LowFreq: 3560 HighFreq: 3570,<br>LowFreq: 3570 HighFreq: 3580, ...<br>LowFreq: 3690 HighFreq: 3700;<br>channel type GAA;<br>maxEIRP = 17} |

Domain proxy 106 then provides to non-real time RIC 104 a channel information trigger that includes SI information 314 for channel selection. SI information 314 is provided as an input a channel selection algorithm 316 running as rApp 108 on non-real time RIC 104. As discussed later with reference to FIG. 4, channel selection algorithm 316 entails preparing a channel group and developing a priority channel list.

Next, non-real time RIC 104 provides to domain proxy 106 a suitable channel for grant 318. Domain proxy 106 takes this channel for a grant request 320 to SAS 110.

Once grant response 322 is received, an ongoing heartbeat request 324 and heartbeat response 326 are triggered. Domain proxy 106 provides channel information 328 to SMO 102. SMO 102 configures channel 330 via O-DU 120. And O-DU 120 configures channel 332 at CBSD 130.

Figure 4:
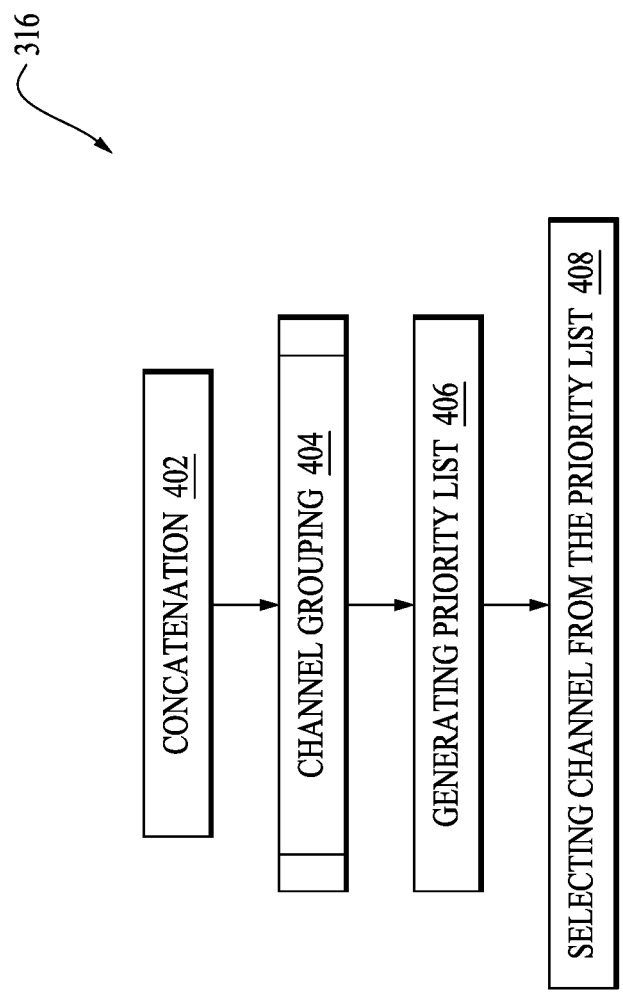
FIG. 4 is a flow diagram showing a process for channel selection in accordance with one embodiment.

FIG. 4 shows in greater detail process 316, performed by non-real time RIC 104, for channel selection. Initially, channel selection algorithm 316 entails concatenation 402 of contiguous channels received in SI response 312 (FIG. 3) from SAS 110, based on the desired bandwidth (e.g., 40 MHz) and desired frequency range (e.g., 3600-3640 MHz). The first column of FIG. 5 shows an example concatenation. At the top of the list are 40 MHz channels in the desired range, followed by 20 MHz channels, and then 10 MHz channels.

Next, channel selection algorithm 316 entails channel grouping 404 of the concatenated list based on channel type (PAL or GAA) and desired bandwidth. The channel type is provided in SI information 314 (FIG. 3). The second column of FIG. 5 shows an example grouping. At the top of the priority list are the PAL channels, followed by GAA channels. Higher bandwidth (in the desired range) is also prioritized. If the desired channel is partially available in the concatenated channel set, channel selection algorithm 316 will add only overlapped channels in the priority list. Lower BW PAL should be given priority. If the desired channel (partially or fully) is not in the concatenated channel set, channel selection algorithm 316 adds the remaining channel list from SI response 312 to the priority list after the desired channels.

If desired MaxEIRP is provided, then the channels are added in priority list in descending order of the MaxEIRP. The third column of FIG. 5 shows this list.

Next, channel selection algorithm 316 entails generating priority list 406, which can be represented as {desired ch1, ch2, . . . , chN, other than desired channels lists}. An example is shown in the fourth column of FIG. 5. In the fourth column, optional processing may be performed to generate the final list. For instance, total EIRP value may be scaled based on the corresponding bandwidth to reflect the total output power. Although the grouping of the channels in this example is performed in discrete steps (e.g., grouping by bandwidth, the channel type, then EIRP), other grouping and prioritization techniques may be employed in different embodiments.

Channel selection algorithm 316 then entails non-real time RIC 104 selecting channel from the priority list 408, i.e., the first option in the priority list. Initial channel selection is therefore based on operator input, channel type, BW, and EIRP. The channel selection is provided 318 (FIG. 3) to domain proxy 106.

Figure 6:
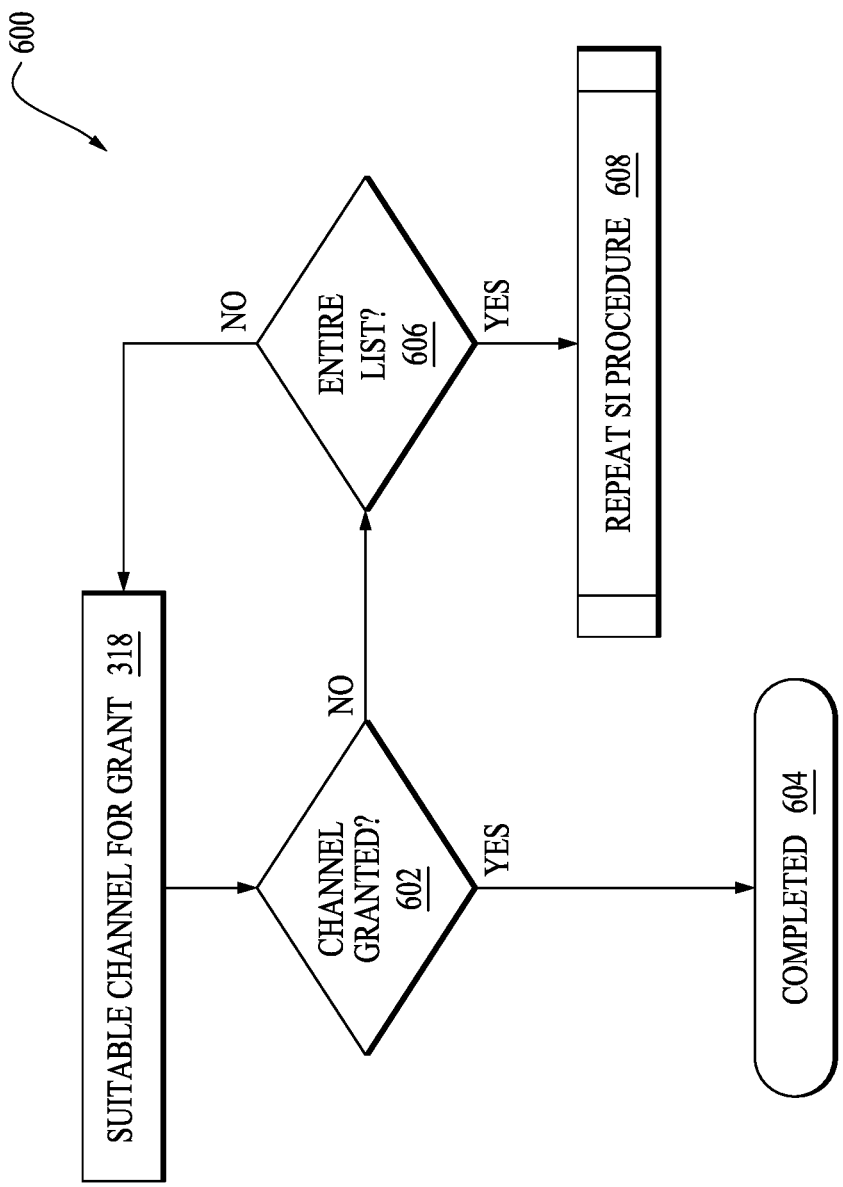
FIG. 6 is a flow diagram showing a process for channel selection in accordance with one embodiment.

FIG. 6 shows a process 600, performed by domain proxy 106 in coordination with non-real time RIC 104, to generate grant request 320 (FIG. 3) for SAS 110. From the example priority list above, domain proxy 106 receives a suitable channel for grant 318 (FIG. 3), calculates total EIRP for allocated bandwidth (based on the 10 MHz EIRP), and requests 320 (FIG. 3) a grant on that channel (e.g., {3600-3640}). If the channel is granted 602, then process 600 is complete 604.

If the channel is not granted, then domain proxy 106 signals (not shown) a grant rejection to non-real time RIC 104 for selecting another channel from the priority list 408 (FIG. 4). In other words, if SAS 110 does not provide a grant, then the second channel from the list is provided to domain proxy 106, i.e., {3600-3620}, at step 318, and so forth.

If non-real time RIC 104 determines a channel is not granted from the entire desired list 606, then domain proxy 106 may optionally repeat SI procedure 608 (see, e.g., SI request 310, FIG. 3) up to N times (where N is configurable).

If step 608 does not result in a grant, then domain proxy 106 may request a grant on the desired channel and bandwidth. If that fails, process 600 stops and domain proxy 106 raises an alarm, e.g., for SMO 102.

After channel selection is made for the desired channel (e.g., 3600-3640), the channel conditions may be monitored for interference or a dynamic protection area (DPA) condition. In response, rApp 108 triggers domain proxy 106 to take a grant on 3590-3630, if available, or else it will try the next option available in the priority list (FIG. 5). The list can also be regrouped, depending on dynamic factors, as explained below. The channel reselection algorithm in some embodiments is able to regroup the available channels based on SI information for maximizing coverage, capacity, and efficiency in the system.

Once the DPA condition is over, non-real time RIC 104 triggers domain proxy 106 to release the grant (3600-3640), so that other CBSDs can utilize it. Details of this channel reselection are shown and described with reference to FIG. 7-FIG. 13).

Figure 7:
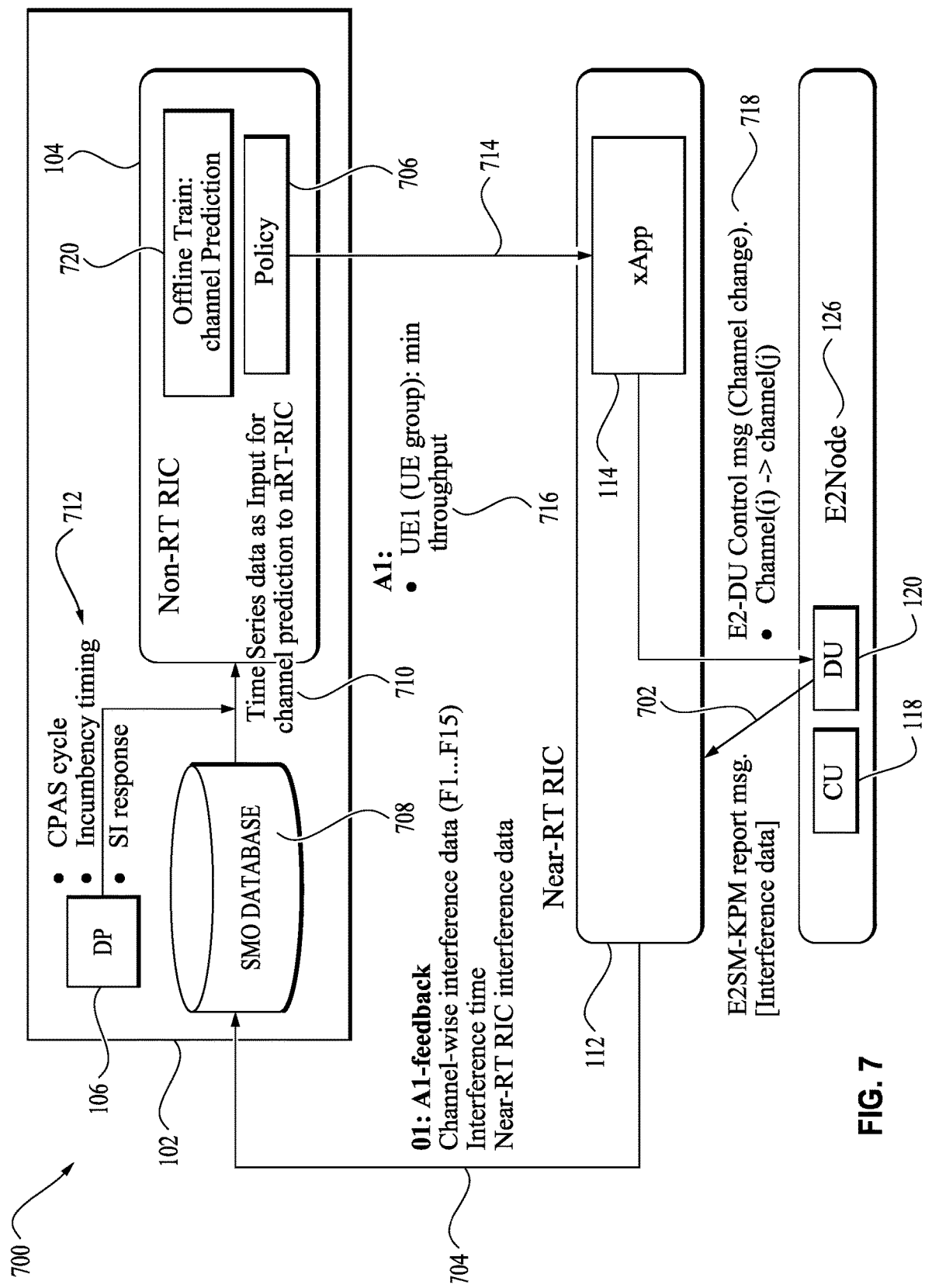
FIG. 7 is an annotated block diagram showing an O-RAN architecture in accordance with one embodiment.

FIG. 7 provides an example O-RAN architecture 700 for AI/ML-based channel reselection and release performed at non-real time RIC 104 based on input from SMO 102, non-real time domain proxy 106, near-real time RIC 112, and E2 nodes 126.

Initially, O-DU 120 triggers, via the E2 interface, an E2SM-KPM report message 702 for near-real time RIC 112. O-RAN.WG3.E2SM-KPM-R003-v03.00 is the document titled "O-RAN E2 Service Model: Key Performance Measurement (E2SM-KPM)," which specifies the capabilities exposed over E2 interface to enable report of measurements from any of O-DU, O-CU-CP, and O-CU-UP. In the example of FIG. 7, E2SM-KPM report message 702 includes interference data representing, e.g., an interference pattern on the CBRS channel, explained later with reference to FIG. 9.

Near-real time RIC 112 is configured to aggregate interference information and provide it to SMO 102 and non-real time RIC 104 over, respectively, O1 and A1 interfaces (see, e.g., FIG. 1 and FIG. 2). In the example of FIG. 7, the aggregated interference information is referred to as O1: A1-feedback 704 because it is provided over the O1 interface and represents feedback configured from a policy 706 over the A1 interface (hence, A1 feedback). O1: A1-feedback 704 includes interference data for each of the 15 channels that are 10 MHz wide, interference time, and interference data of near-real time RIC 112 (i.e., interference data per 10-40 MHz channels established via near-real time RIC 112, see, e.g., FIG. 9). O1: A1-feedback 704 optionally includes an E2 node identifier, since near-real time RIC 112 may collect data from multiple E2 nodes. Once O1: A1-feedback 704 is received at SMO 102, it is stored locally in an SMO database 708.

Next, non-real time RIC 104 queries SMO database 708 and domain proxy 106 (via REST API) to obtain time series data 710 used for channel prediction. Skilled persons will appreciate that there could be more than one domain proxy 106 instance interfacing via an associated REST API. This ensures that the channel reselection is not impacted by the failure of a single domain proxy instance.

Time series data 710 obtained directly from domain proxy 106 is referred to as domain proxy time series data 712. Domain proxy time series data 712 includes CPAS cycle timing (see, e.g., FIG. 10), incumbency timing (see, e.g., FIG. 11), and SI response (see, e.g., SI response 312, FIG. 3). In general, time series data 710 represents serving channel condition, interference time pattern, interference data of near-real time RIC 112, and traffic pattern (e.g., for energy saving).

Non-real time RIC 104 uses time series data 710 to train a channel prediction model. The model is then used to generate and update a policy 706 for triggering O1: A1-feedback 704 and predicting an optimal channel. For instance, non-real time RIC 104 employs traffic pattern prediction to efficiently manage bandwidth utilization based policy 706, which is based on an interference pattern on the channel (refer to FIG. 9), SAS CPAS cycle (FIG. 10), or presence of higher-tier users (FIG. 11).

In one example, during nighttime, policy 706 configures near-real time RIC 112 to dynamically reduce the bandwidth allocation by obtaining a new grant with the lowest supported bandwidth. In preparation for the upcoming traffic surge, i.e., a couple of hours before (typically around 6 AM), policy 706 configures near-real time RIC 112 to revert to the best available channel. Additionally, on Saturdays and Sundays, policy 706 configures near-real time RIC 112 to operate at reduced bandwidth so as to optimize network performance during weekends when traffic demands are typically lower. Once policy 706 is developed, it is communicated to near-real time RIC 112, as described later with reference to FIG. 8.

With reference to FIG. 7, non-real time RIC 104 triggers over an A1 interface 714 a UE1 (UE group) minimum throughput 716 toward near-real time RIC 112. Minimum throughput 716 is just one example of a policy object that, for a given group of UEs, indicates near-real time RIC 112 should trigger a channel change in response to the average throughput for the group dropping below minimum throughput 716. Additional details for load balancing are described later with reference to FIG. 12. Various other policy objects may be defined, such as, for example, time of day, energy use, and other criteria.

Finally, xApp 114 checks these policies to trigger toward O-DU 120 an E2-DU control message (channel change) 718. Domain proxy 106 maintains the old channel for a fixed time period and then releases it so that it can be utilized by the other CBSDs.

Figure 8:
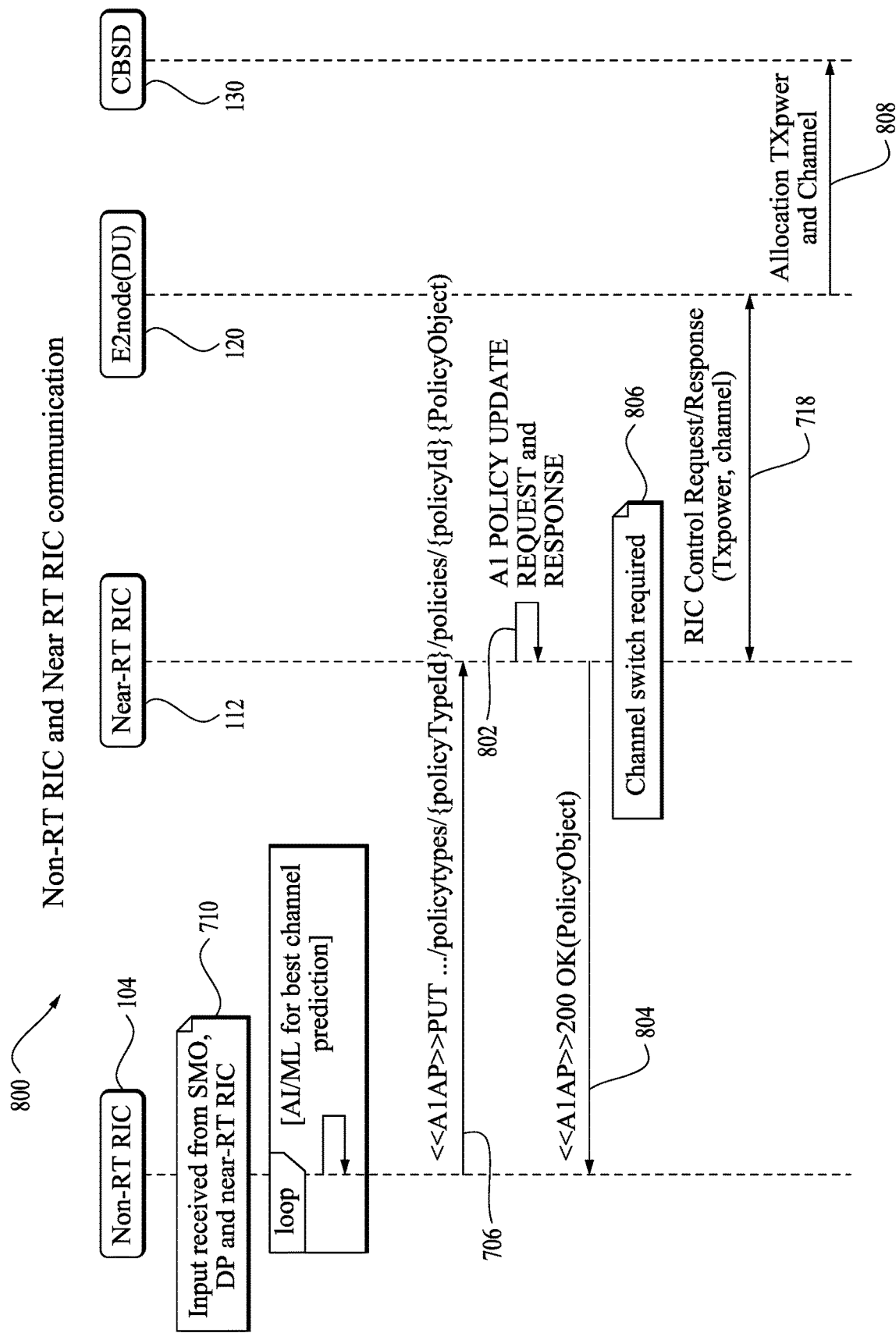
FIG. 8 is a message sequence diagram showing a process for channel reselection in accordance with one embodiment.

FIG. 8 shows a process 800 for channel reselection. As described previously, non-real time RIC 104 receives time series data 710. Based on an event in time series data 710, which is analyzed by previously trained AI/ML of non-real time RIC 104, rApp 108 of non-real time RIC 104 generates policy 706 to reselect the channel prior to releasing the existing channel (to minimize the downtime of the CBSD cell). Policy 706 is provided to near-real time RIC 112 via A1 interface 714 (FIG. 7), as shown in A1 policy update request and response 802 and A1AP 200 Ok 804.

Near-real time RIC 112 may be a centralized or distributed instance. XApp 114 of near-real time RIC 112 determines, based on policy 706, that a channel switch is required 806. XApp 114 ensures policy 706 triggers via A1 interface 714 are ultimately sent to the desired E2 node 126.

Near-real time RIC 112 then triggers toward O-DU 120 E2-DU control message (channel change) 718, which is a RIC control request/response specifying the new channel and transmit power. O-DU 120 then triggers an allocation 808 toward CBSD 130.

Figure 9:
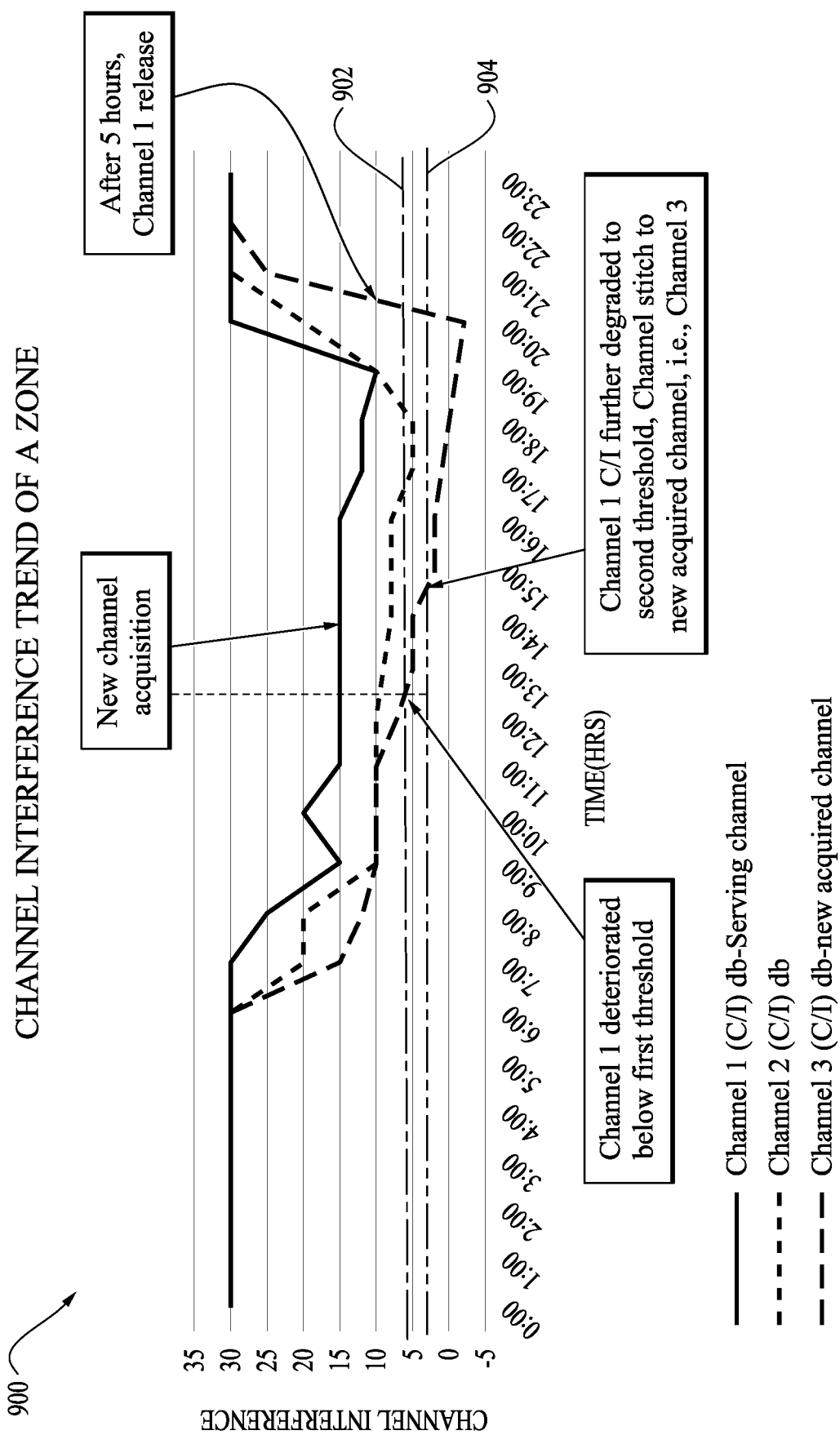
FIG. 9 is a graph showing a channel interference in accordance with one embodiment.

FIG. 9 shows an example of time series data 900 for an interference pattern on the channel as a function of time of day for three channels (e.g., 40 MHz channels). Time series data 900 is shown in the form of a graph, and the specific data structure for reporting this data may include various other implementations.

As described previously, near-real time RIC 112 sends time series data 900 to SMO 102 in the form of E2SM-KPM report message 702 (FIG. 7). Non-real time RIC 104 uses time series data 900 as one of the inputs for channel prediction. Non-real time RIC 104 generates policy 706 based on time series data 900.

In one example, policy 706 indicates for near-real time RIC 112 that, whenever a serving channel carrier-to-interference ratio (C/I) goes below a first threshold 902, near-real time RIC 112 triggers O-DU 120 to acquire the new channel. Next, non-real time RIC 104 may initiate the switch to the channel according to an A1 policy provided to near-real time RIC 112 for channel change. Thus, in response to C/I going below a second threshold 904, near-real time RIC 112 sends the control command to change the channel.

In the case the CBSD does not use the secondary channel, after monitoring for a fixed period, domain proxy 106 releases it. Domain proxy 106 will keep the old channel for a fixed period and then release it, so that it can be utilized by the other CBSDs.

Figure 10:
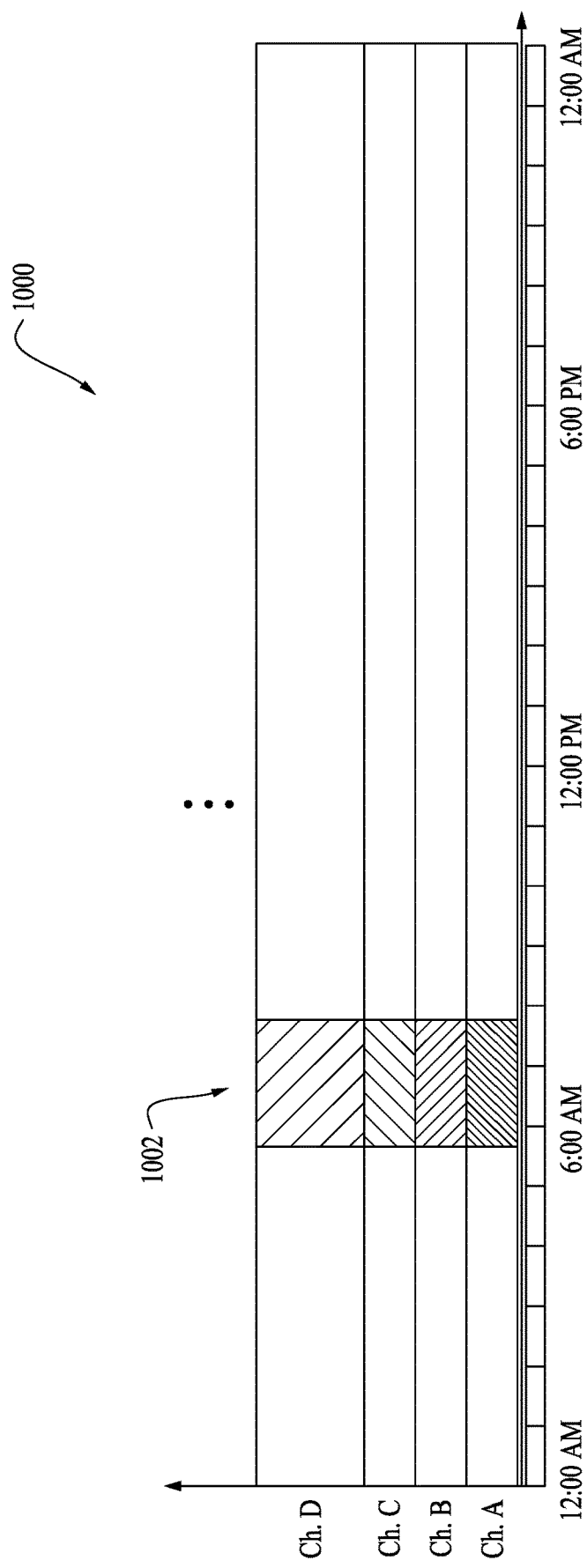
FIG. 10 is a timeline showing a CPAS cycle in accordance with one embodiment.
Figure 11:
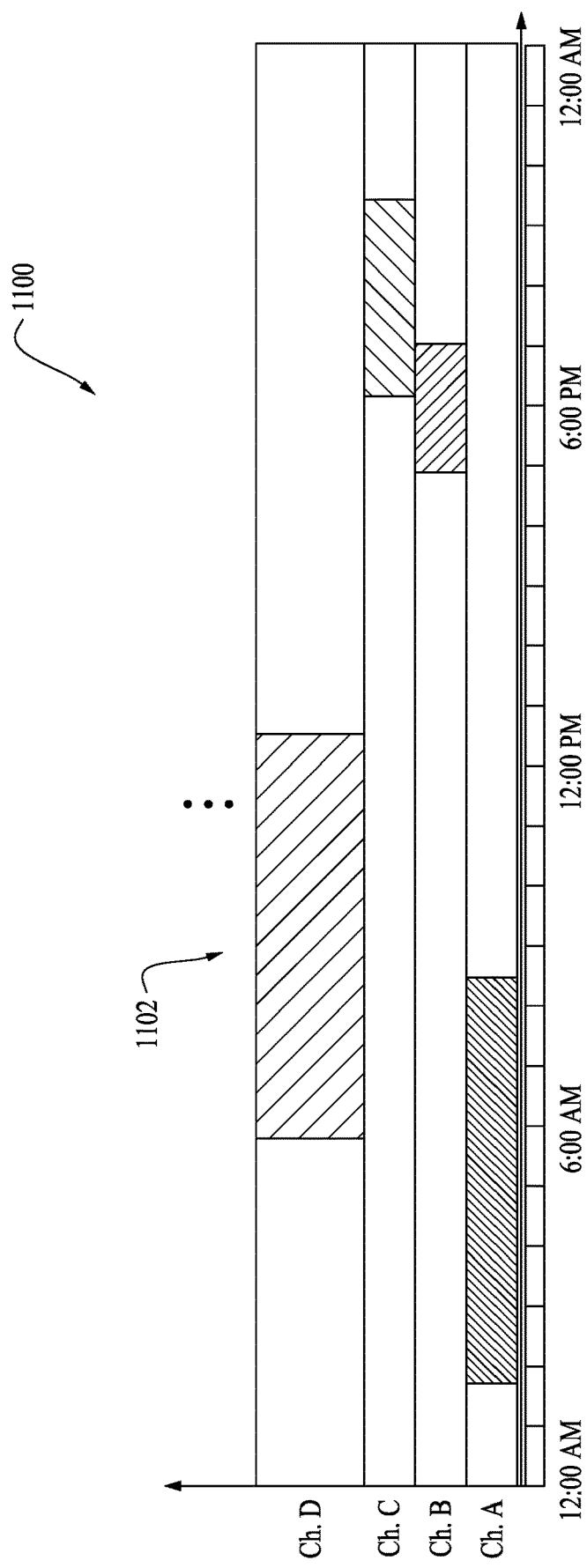
FIG. 11 is a timeline showing an incumbency timing in accordance with one embodiment.

FIG. 10 shows an example of time series data 1000 for a CPAS cycle time for four channels (e.g., three 10 MHz channels and one 20 MHz channel). As CBSDs are taking service from different SASs, they reconcile the data to achieve synchronous power allocation among all SASs. This process is known as CPAS. CPAS is a periodic process performed by all SAS administrators synchronously. During CPAS, SASs provide the grants, but authorization happens after the CPAS cycle is completed. Secondary channel acquisition, therefore, may be in such a manner domain proxy 106 is aware of the CPAS cycle, as defined in the document titled, "Spectrum Sharing Committee Policy and Procedure Coordinated Periodic Activities Policy," available from the Wireless Innovation Forum (document WINNF-SSC-0008-V1.0.0). By determining the CPAS cycle based on data from domain proxy 106, non-real time RIC 104 predicts what is going to happen in the presence of higher-tiered users.

Time series data 1000 is in the form of a timeline showing time blocks 1002 during which domain proxy 106 receives from SAS 110 a grant response message indicating an unsuccessful grant due to the CPAS cycle. The specific timing for time blocks 1002 is derived based on failure messages from SAS 110 to domain proxy 106. As explained in the document titled "Signaling Protocols and Procedures for Citizens Broadband Radio Service (CBRS): Spectrum Access System (SAS)-Citizens Broadband Radio Service Device (CBSD) Interface Technical Specification," available from the Wireless Innovation Forum (document WINNF-TS-0016-V1.2.7), an unsuccessful grant is indicated in the response message by a GrantResponse indicating failure. There may be various causes for a failure, but domain proxy 106 is able to infer that the cause was attributable to the CPAS cycle time because WINNF-TS-0016-V1.2.7 specifies an error code parameter (e.g., Table 39 of WINNF-TS-0016-V1.2.7) and optional supplemental data explaining the nature of the error. In the case of an active CPAS cycle, the error code is 501 "SUSPENDED GRANT" for all channels.

FIG. 11 shows an example of time series data 1100 for incumbency timing or other higher-tier users (e.g., PAL). Similar to time series data 1000, time series data 1100 includes time blocks 1102 representing failure messages from SAS 110 to domain proxy 106. In this example, time blocks 1002 are inferred based on the error code of 501 and associated messaging. For instance, at 6:00 PM in channel C, there is an incumbent user using that channel for about 3.5 hours.

Figure 12:
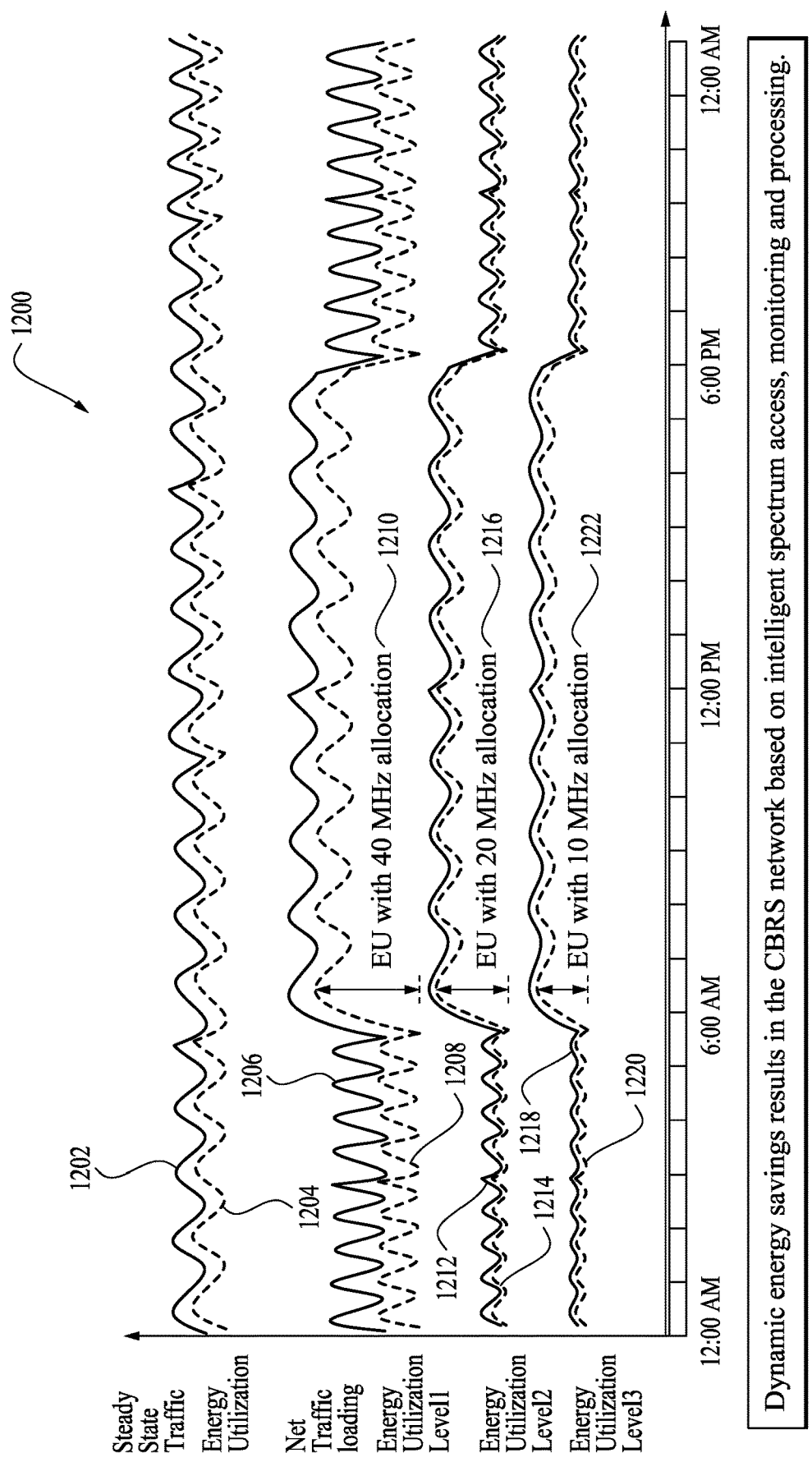
FIG. 12 is a graph showing bandwidth allocations and energy use in accordance with one embodiment.

FIG. 12 shows a time series data 1200 used by non-real time RIC 104 (rApps) and near-real time RIC 112 (xApps) for managing energy savings in private 5G CBRS networks, which facilitates cost-effective network operations for service providers. For instance, FIG. 12 shows aggregate traffic 1202 over time and corresponding energy utilization 1204. Within aggregate traffic 1202 there are three example channels shown. A 40 MHz channel is shown as having traffic loading 1206 and energy utilization 1208, which both show a spike 1210 in the daytime hours. Similarly, a 20 MHz channel is shown as having traffic loading 1212 and energy utilization 1214, both of which spike 1216. Finally, a 10 MHz channel is shown as having traffic loading 1218 and energy utilization 1220, both of which spike 1222.

By continuous monitoring applications in non-real time RIC 104 (rApps) and near-real time RIC 112 (xApps), and correlation with physical resource utilization as well as geographical traffic patterns, the RAN enables service providers to efficiently utilize the power available to the cell sites for smart energy savings. Communication service providers and energy distributors may collaborate to determine alternate sources of cost-effective energy based on AI-enabled learning patterns with CBRS channel allocations and traffic dynamics in each county, region, or state.

In another embodiment, non-real time RIC 104 and near-real time RIC 112 also facilitate load balancing and mobility of users in a CBRS network. For instance, if a 10 MHz cell is constrained in terms of processing resources, non-real time RIC 104 generates a policy 706 (FIG. 7) to move users to a 40 MHz cell. By looking at traffic utilization on each cell, the load balancing moves users from one CBSD to another CBSD. Furthermore, as mentioned previously, the channel reselection algorithm in some embodiments is able to regroup the available channels based on SI information for maximizing coverage, capacity, and efficiency in the system.

With domain proxy 106 and non-real time RIC 104 working in tighter coordination to request, select, operate, and maintain the CBRS channels based on time of day, geographical location, and traffic dynamics, the channel selection algorithm triggers energy savings by dynamically offloading carriers while not compromising the overall network functionality and services delivery.

Figure 13:
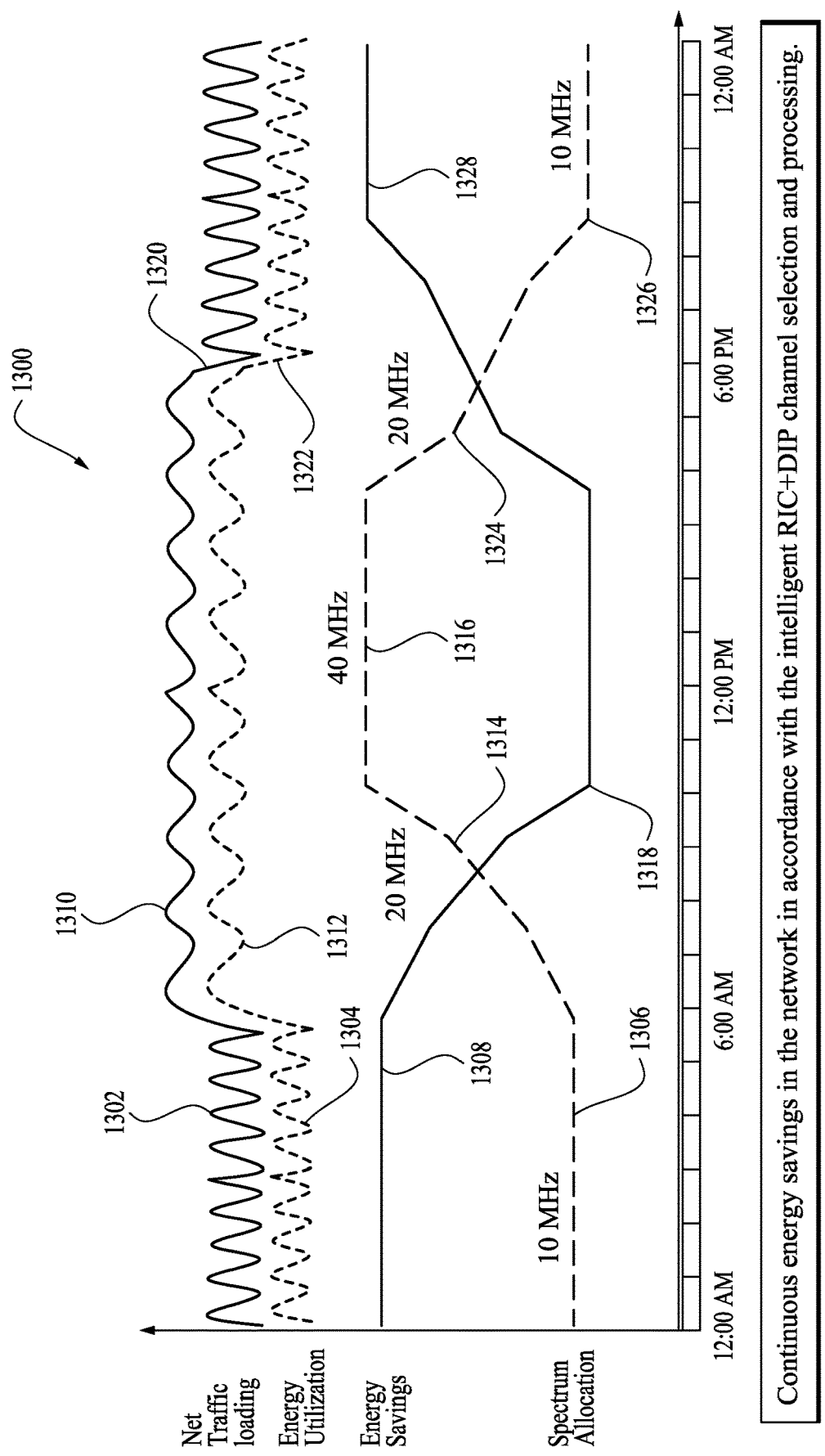
FIG. 13 is a graph showing bandwidth allocations and energy use in accordance with one embodiment.

For example, FIG. 13 shows time series data 1300 in a situation where domain proxy 106 initially requested SAS 110 granted 40 MHz bandwidth. In the morning hours, however, nominal net traffic loading 1302 and nominal energy utilization 1304 are relatively low. Thus, based on AI-enabled time-of-day traffic pattern learning and physical resources utilization, non-real time RIC 104 evaluates the spectrum grant needs and proactively instructs domain proxy 106 to lower the grant request from 40 MHz to 20 or 10 MHz bandwidth 1306 for an operator configurable duration. This results in energy savings 1308.

Later that day, as traffic 1310 and energy utilization 1312 increase, non-real time RIC 104 triggers 20 MHz bandwidth 1314 and then 40 MHz bandwidth 1316. The increased spectrum use temporarily reduces energy savings 1318. With continuous learning, domain proxy 106 and non-real time RIC 104 work in tandem to request a higher spectrum grant, based on the network design capabilities, well in advance to anticipate the daily traffic pattern growth over time.

Finally, as traffic 1320 and energy utilization 1322 are reduced, bandwidth 1324 is reduced to 20 MHz and then bandwidth 1326 is reduced to 10 MHz, which increases energy savings 1328. Continuous monitoring and driving lower RF bandwidth operations results in net energy savings for service providers. Within a RAN network, the radio and baseband units need not always run at full bandwidth to support the 5G data requirements in accordance with the dynamics of the traffic patterns. Non-real time RIC 104 platform continuously receives feedback from SMO 102 layer to analyze, map, and provide the channel selection input to domain proxy 106 to enable it to request channels from SAS 110 for intelligent 5G network operations.

As another example, if the network functions are upgraded to handle higher spectrum allocations such as 80 MHz for targeted regions, domain proxy 106 and non-real time RIC 104 adapt their system configurations to request, process, maintain, and release the wider channels accordingly.

Figure 14:
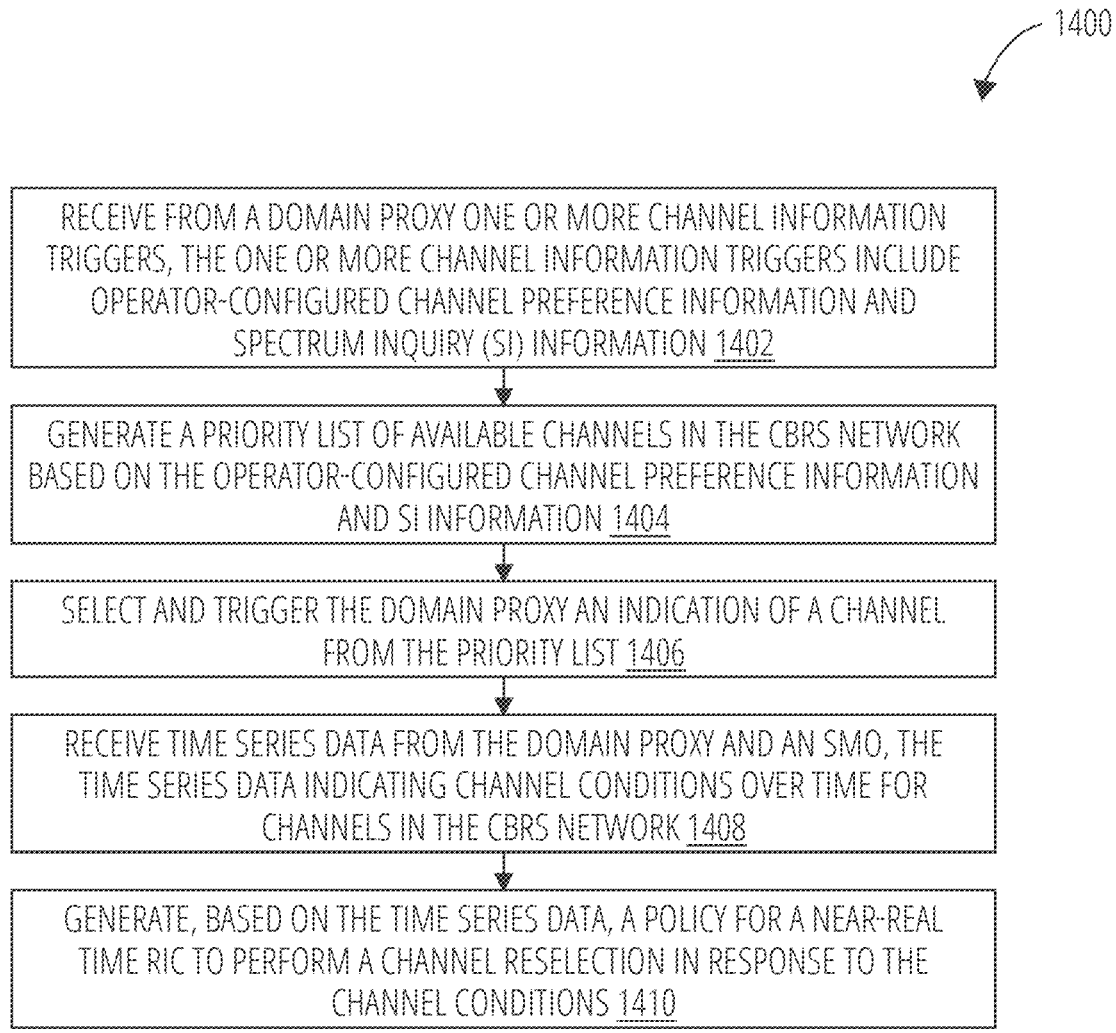
FIG. 14 is a flow diagram of a process for providing channel selection and reselection in accordance with one embodiment.

FIG. 14 shows a process 1400, performed by non-real time RIC 104 in an O-RAN configured to operate a CBRS network, for providing channel selection and reselection. In block 1402, process 1400 receives from a domain proxy one or more channel information triggers, the one or more channel information triggers including operator-configured channel preference information and SI information. In block 1404, process 1400 generates a priority list of available channels in the CBRS network based on the operator-configured channel preference information and SI information. In block 1406, process 1400 selects and triggers the domain proxy an indication of a channel from the priority list. In block 1408, process 1400 receives time series data from the domain proxy and an SMO, the time series data indicating channel conditions over time for channels in the CBRS network. In block 1410, process 1400 generates, based on the time series data, a policy for a near-real time RIC to perform a channel reselection in response to the channel conditions.

Process 1400 may also include regenerating the priority list based on updated SI information for use in channel reselection.

Process 1400 may also include the time series data being A1 feedback.

Process 1400 may also include the A1 feedback indicating channel interference over time.

Process 1400 may also include the A1 feedback indicating network traffic load and energy utilization over time provided over an O1 interface.

Process 1400 may also include the network traffic load and energy utilization for channel reselection being received in response to energy efficiency metrics measured at CBSDs in a location associated with a specified spectrum grant allocation or the SI information.

Process 1400 may also include the time series data comprising domain proxy time series data.

Process 1400 may also include the domain proxy time series data indicating CPAS cycle timing.

Process 1400 may also include the domain proxy time series data indicating incumbency timing.

Process 1400 may also include the domain proxy time series data indicating SI responses.

Process 1400 may also include the policy triggering the channel reselection in response to traffic utilization for load balancing between CBSDs.

Figure 15:
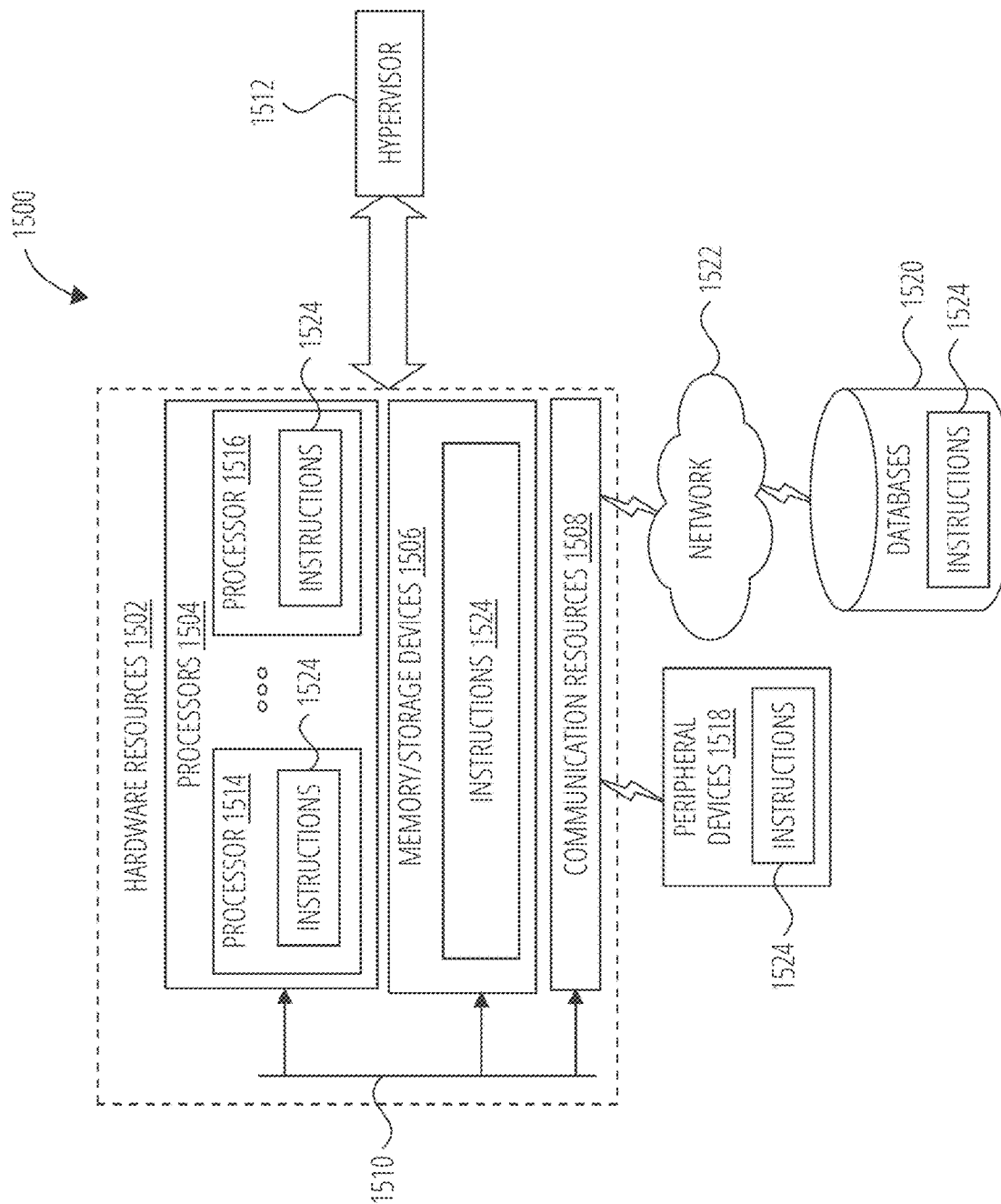
FIG. 15 is a block diagram of computing components for performing the disclosed procedures in accordance with one embodiment.

FIG. 15 is a block diagram illustrating components 1500, according to some example embodiments, configured to read instructions from a machine-readable or computer-readable medium (e.g., a non-transitory machine-readable storage medium) and perform any one or more of the methods discussed herein (or portions thereof), such as discussed for process 300, process 316, process 600, process 800, process 1400, or any portions of these processes.

Specifically, FIG. 15 shows a diagrammatic representation of hardware resources 1502 including one or more processors 1504 (or processor cores), one or more memory/storage devices 1506, and one or more communication resources 1508, each of which may be communicatively coupled via a bus 1510. For embodiments where node virtualization (e.g., NFV) is utilized, a hypervisor 1512 may be executed to provide an execution environment for one or more network slices/sub-slices to utilize hardware resources 1502.

Processors 1504 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1514 and a processor 1516.

Memory/storage devices 1506 may include main memory, disk storage, or any suitable combination thereof. Memory/storage devices 1506 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1508 may include interconnection or network interface components or other suitable devices to communicate with one or more peripheral devices 1518 or one or more databases 1520 via a network 1522. For example, communication resources 1508 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1524 may comprise software, a program, an application, an applet, an app, or other executable code for causing at least any of processors 1504 to perform any one or more of the methods discussed herein. Instructions 1524 may reside, completely or partially, within at least one of processors 1504 (e.g., within the processor's cache memory), memory/storage devices 1506, or any suitable combination thereof. Furthermore, any portion of instructions 1524 may be transferred to hardware resources 1502 from any combination of peripheral devices 1518 or databases 1520. Accordingly, the memory of processors 1504, memory/storage devices 1506, peripheral devices 1518, and databases 1520 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a non-real time RAN intelligent controller (RIC) in an Open Radio Access Network (O-RAN) configured to operate a citizens broadband radio service (CBRS) network, for providing channel selection and reselection, the method comprising:
   receiving from a domain proxy one or more channel information triggers, the one or more channel information triggers including operator-configured channel preference information and spectrum inquiry (SI) information;
   generating a priority list of available channels in the CBRS network based on the operator-configured channel preference information and SI information;
   selecting and triggering the domain proxy an indication of a channel from the priority list;
   receiving time series data from the domain proxy and an service management and orchestration (SMO), the time series data indicating channel conditions over time for channels in the CBRS network; and
   generating, based on the time series data, a policy for a near-real time RIC to perform a channel reselection in response to the channel conditions.

2. The method of claim 1, in which the time series data includes an E2 node identifier for associating the time series data with an E2 node.

3. The method of claim 1, further comprising regenerating the priority list based on updated SI information for use in channel reselection.

4. The method of claim 1, in which the time series data includes A1 feedback.

5. The method of claim 4, in which the A1 feedback indicates channel interference over time.

6. The method of claim 4, in which the A1 feedback indicates network traffic load and energy utilization over time provided over an O1 interface.

7. The method of claim 6, in which the network traffic load and energy utilization for channel reselection are received in response to energy efficiency metrics measured at citizens broadband radio service devices (CBSDs) in a location associated with a specified spectrum grant allocation or the SI information.

8. The method of claim 1, in which the time series data includes domain proxy time series data.

9. The method of claim 8, in which the domain proxy time series data indicates cooperative periodic activities among spectrum access systems (CPAS) cycle timing.

10. The method of claim 8, in which the domain proxy time series data indicates incumbency timing.

11. The method of claim 8, in which the domain proxy time series data indicates SI responses.

12. The method of claim 1, in which the policy triggers the channel reselection in response to traffic utilization for load balancing between CBSDs.

13. A non-real time RIC configured to perform channel selection and reselection for an O-RAN to operate a CBRS network, the non-real time RIC comprising:
   a REST API interface configured to receive, from a domain proxy, operator-configured channel preference information and domain proxy time series data, and to provide a channel selection from the non-real time RIC;

an R1 interface configured to receive, from an SMO database storing A1 feedback from a near-real time RIC, the A1 feedback representing channel interference over time; and an A1 interface configured to trigger, toward the near-real time RIC, a policy for channel reselection in response to the domain proxy time series data and the A1 feedback.

14. The non-real time RIC of claim 13, in which the A1 feedback indicates channel interference over time.

15. The non-real time RIC of claim 13, in which the A1 feedback indicates network traffic load and energy utilization over time provided over an O1 interface.

16. The non-real time RIC of claim 13, in which the domain proxy time series data indicates CPAS cycle timing.

17. The non-real time RIC of claim 13, in which the domain proxy time series data indicates incumbency timing.

18. The non-real time RIC of claim 13, in which the domain proxy time series data indicates SI responses.

19. The non-real time RIC of claim 13, in which the policy triggers the channel reselection in response to traffic utilization for load balancing between CBSDs.

20. The non-real time RIC of claim 13, in which the domain proxy includes multiple domain proxy instances for interfacing with the non-real time RIC via the REST API interface.

* * * * *